April 1, 1969 F. GROSS 3,436,586

FREQUENCY MODULATION TUBE FOR THE GENERATION OR AMPLIFICATION OF MILLIMETER WAVES WITH A DELAY LINE ACTING AS A LINE RESONATOR

Filed Jan. 12, 1966

Fig.2 A–B

INVENTOR
Franz Gross

BY Spiel & Spiel

ATTY.S.

United States Patent Office 3,436,586
Patented Apr. 1, 1969

3,436,586

FREQUENCY MODULATION TUBE FOR THE GENERATION OR AMPLIFICATION OF MILLIMETER WAVES WITH A DELAY LINE ACTING AS A LINE RESONATOR

Franz Gross, Munich, Germany, assignor to Siemens Aktiengesellschaft, Munich, Germany, a corporation of Germany Filed Jan. 12, 1966, Ser. No. 520,142
Claims priority, application Germany, Jan. 15, 1965, S 95,027
Int. Cl. H01j 25/34
U.S. Cl. 315—3.5 7 Claims

ABSTRACT OF THE DISCLOSURE

A frequency modulation tube having an electron beam generator at one end and an electron collector at the other end with at least one delay line arranged therebetween. The delay line is permanently coupled by means of an intermediate hollow conductor portion and a vacuum tight decoupling window. The window is mounted to a rectangular cross-section decoupling conductor. The decoupling conductor is provided with a tuning rod which is slidably mounted in the longitudinal direction of the decoupling conductor. A metal body of rectangular cross-section is disposed on the free end of the tuning rod such that the ratios of the width of the metal body to the width of the hollow decoupling conductor, and the height of the metal body to the height of the decoupling conductor lie between 0.7 and 0.95.

Figure 1:
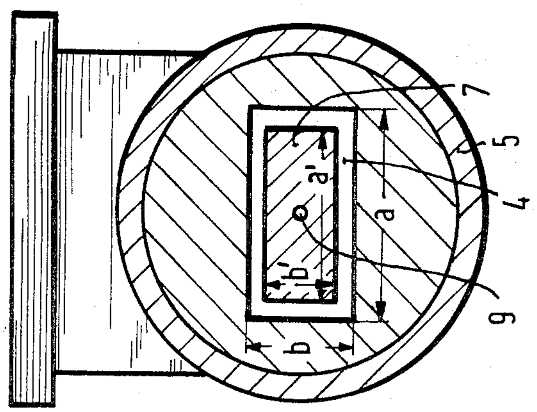
Figure 1:
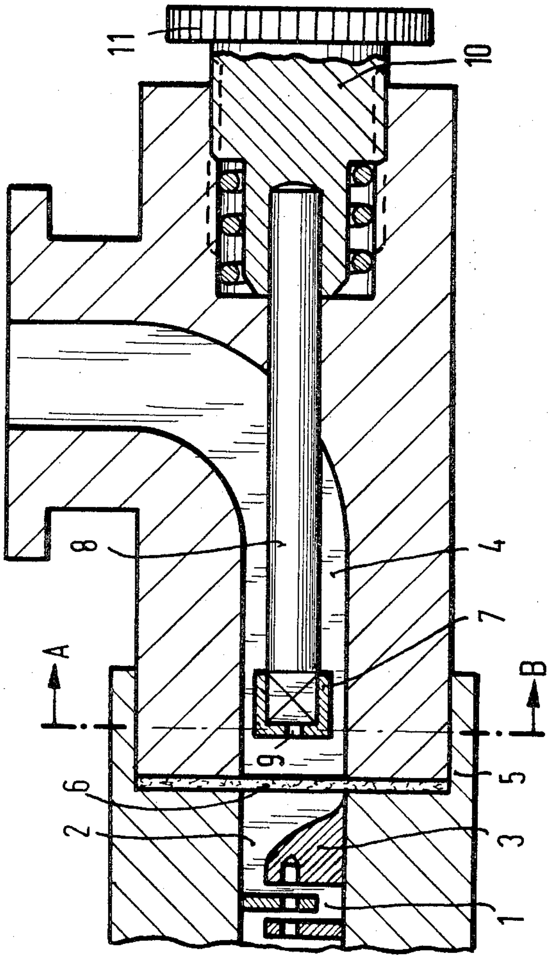

The invention relates to a frequency modulation tube for the generation or amplification of millimeter waves having an electron beam generator at one end and an electron collector at the other end of the tube, with at least one delay line arranged therebetween, acting as a line resonator, which is permanently coupled over an intermediate hollow conductor portion and a vacuum tight decoupling window, followed by a hollow decoupling conductor of rectangular cross section, provided with a tuning member which is slidable in the longitudinal direction of the decoupling hollow conductor.

Frequency modulation tubes of this general type are known, and in this connection there is involved a tube for the generation of millimeter waves, in which the collector end of the delay line is permanently coupled over a hollow-line intermediate portion containing the electron collector, and over a vacuum tight decoupling window following thereupon, with the hollow decoupling conductor.

It has proved that in the known frequency modulation tube mentioned the design of the tuning structure, which is provided in the decoupling hollow conductor and is slidable therein in the longitudinal direction of the hollow conductor, presents problems when it is desired to achieve optimal decoupling from the line resonator. The invention, therefore, has as its basic problem that of so designing the tuning structure of a frequency modulation tube, having a delay line functioning as line resonator, that a maximum output is decoupled from the line resonator. For the solution to this problem, in a frequency modulation tube of the type initially mentioned, it is proposed according to the invention that the tuning structure contain an insulating rod or bar of dielectric material which extends in longitudinal direction of the decoupling hollow conductor and carries, on its free end adjacent to the decoupling window, a metal body of rectangular cross section which is free of contact with the inside wall of the decoupling hollow conductor, in which ararngement the respective ratios of the width of the metal body to the width of the hollow decoupling conductor, and of the height of the metal body to the height of the hollow decoupling conductor are each equal to a value between 0.7 and 0.95.

In a frequency modulation tube according to the invention the dimension of the metal tuning body, in relation to the cross section of the decoupling hollow conductor, with which a favorable separation of the oscillation modes of the line resonator is associated, assures an optimum output decoupling. Simultaneously, through the contact-free suspension of the metal tuning body on an insulating rod, a specific tuning of the line resonator may be set exactly, and repeated as often as desired.

The invention will be explained in detail with the aid of the drawing, illustrating an example of the invention, and in which:

FIG. 1 is a longitudinal section through a tube according to the invention, at the collector end thereof; and FIG. 2 is a transverse section taken approximately on the line A–B of FIG. 1.

Referring to FIG. 1, which in part is a simplified representation, reference numeral 1 designates a delay line which is to be closed off reflectively at both ends (line resonator). The delay line 1 merges, over a short hollow conductor intermediate portion 2 which contains the electron collector in the form of a lengthwise tapered member 3 provided with a bore, into a hollow decoupling conductor 4 of rectangular cross section. Between the hollow decoupling conductor and the end portion 5 of the tube, into which the hollow decoupling conductor 4 is preferably screwed and/or cemented, there is disposed a vacuum tight decoupling window 6.

Arranged in the hollow decoupling conductor 4 is a tuning structure which consists of a metal body 7, of rectangular cross section, which presents the reflecting closure at the collector end of the delay line 1. The metal body 7 is secured, free of contact with the inside wall of the decoupling hollow conductor 4, to an insulating rod or bar 8 of dielectric material, which is slidable in the direction of the longitudinal axis of the decoupling hollow conductor. The metal body 7 preferably is constructed in the form of a cap on the free-standing end of the round insulating bar 8 adjacent to the decoupling window. A hole 9 in the end face of the metal body 7 is provided merely to facilitate the attachment of the cap-shaped metal body 7 to the insulating rod 8. In order to obtain optimal output decoupling with a good separation of the oscillation modes in the line resonator, the ratio of the width of the metal body to the width of the hollow decoupling conductor and of the height of the metal body to the height of the hollow decoupling conductor should in both cases have a value between 0.7 and 0.95. For clarification of these dimensions, in FIG. 2 the width of the metal body 7 is designated as $a'$ and the height as $b'$, while the width and height of the hollow decoupling conductor are designated respectively as $a$ and $b$. The following relations, therefore, should then hold:

$$0.7 \leq a'/a \leq 0.95$$

and $$0.7 \leq b'/b \leq 0.95$$

This is illustrated in the following practical example: In a frequency modulation tube for the generation of millimeter waves with a mean frequency of 35 gigacycles, the hollow decoupling conductor 4 has a width $a$=7.1 mm. and a height $b$=3.55 mm. Optimal output decoupling was obtained with a metal body 7 having a width $a'$=6.6 mm. and a height $b'$=2.8 mm. The extension of the metal body in longitudinal direction of the hollow decoupling conductor 4 in this case amounted to 2.8 mm.

The hollow decoupling conductor 4 advantageously is curved in the form of a circular arc and thus extends away from the decoupling window 6, in which arrangement the insulating rod or bar 8 is conducted from the hollow conductor in the zone of such curvature. With this construction of the decoupling conductor 4 there is associated the advantage that the section of the decoupling conductor containing the insulating bar 8 does not have to be especially adapted electrically to the adjacent sections of the hollow decoupling conductor, as the curvature of the hollow conductor of itself provides a more or less tapering formation. The end of the insulating bar 8 lying externally of the hollow decoupling conductor 4 is attached in a piston 10 which is slidable in longitudinal direction of the insulating bar by means of microscrew drive 11, only schematically indicated. With the aid of the microscrew drive 11, the tuning side member and thereby the effective length of the line resonator can be reproducably varied at will.

The insulating bar 8, which carries the metal tuning body 7, of rectangular cross section at its freestanding end adjacent to the decoupling window, preferably consists of a dielectric with low dielectric constant, in order to keep electrical losses low in the insulating bar 8. The dielectric constant should, in particular, fall between 2 and 4. A suitable material for the insulating bar 8 is quartz, but electrically superior thereto, for example, tetrafluoroethylene, known under the trade name "Teflon."

It should be noted that the invention can be used in a frequency modulation tube both for the generation and also for the amplification of millimeter waves. An amplifier tube with a delay line acting as line resonator can, for example, be realized by an arrangement in which two line resonators which are electronically coupled with one another, are connected in succession. In this case, the decoupling according to the invention is provided on the last line resonator to be traversed by the electron beam.

The invention is not limited to the example of construction illustrated. In particular, it is not necessary that the hollow conductor intermediate portion over which the delay line is coupled with the hollow decoupling conductor contain the electron collector. On the contrary, this intermediate portion may also lead off from the delay line at a right angle, while the delay line is short-circuited metallically in its longitudinal direction and the electron collector is arranged behind such short circuit. It also is possible to arrange further timing means in the hollow decoupler conductor following the tuning slide member.

Changes may be made within the scope and spirit of the appended claims which define what is believed to be new and desired to have protected by Letters Patent.

I claim:

1. In a frequency modulation tube with an electron beam generator at one end and an electron collector at the other end of the tube as well as at least one delay line arranged therebetween which delay line is coupled in fixed relation over an intermediate hollow conductor portion and a following vacuum tight decoupling window with a hollow decoupling conductor of rectangular cross section, which has a tuning structure slidable in the longitudinal direction of the hollow decoupling conductor, the combination of the tuning structure comprising an insulating bar of dielectric material which extends in the longitudinal direction of the hollow decoupling conductor and carries, on its freestanding end adjacent to the decoupling window, a metal body of rectangular cross section, which is free of contact with the interior wall of the hollow decoupling conductor, the ratio of the width $a'$ of the metal body to the width $a$ of the hollow decoupling conductor and of the height $b'$ of the metal body to the height $b$ of the hollow decoupling conductor being equal to a value between 0.7 and 0.95.

2. A frequency modulation tube according to claim 1, wherein the metal body is constructed in the form of a cap disposed on the end of the insulating bar.

3. A frequency modulation tube according to claim 2, wherein the hollow decoupling conductor is curved in the form of a circular arc with its outer end portion turned away from the decoupling window, and the insulating bar is extended outwardly at the zone of the curvature of the hollow conductor therefrom.

4. A frequency modulation tube according to claim 3, wherein the insulating bar is attached at its end lying outside the decoupling conductor to a piston, which is slidable by means of a microscrew gear in the longitudinal direction of the insulating bar.

5. A frequency modulation tube in accordance with claim 1 wherein the insulating bar consists of a low-loss dielectric having a dielectric constant between 2 and 4.

6. A frequency modulation tube according to claim 5, wherein said dielectric material comprises quartz.

7. A frequency modulation tube according to claim 5, wherein said dielectric material comprises tetrafluoroethylene.

References Cited

UNITED STATES PATENTS

| | | | |
|---|---|---|---|
| 3,104,344 | 9/1963 | Wilmarth | 315—5.38 |
| 3,151,267 | 9/1964 | Gross et al. | 315—5.38 |

FOREIGN PATENTS

| | | |
|---|---|---|
| 1,043,066 | 11/1953 | France. |

ELI LIEBERMAN, *Primary Examiner.*

SAXFIELD CHATMON, Jr., *Assistant Examiner.*

U.S. Cl. X.R.

315—39.3